United States Patent [19]
Goloff

[11] 4,025,245
[45] May 24, 1977

[54] COOLED ROTOR

[75] Inventor: Alexander Goloff, East Peoria, Ill.

[73] Assignee: Caterpillar Tractor Co., Peoria, Ill.

[22] Filed: Oct. 28, 1975

[21] Appl. No.: 626,419

[52] U.S. Cl. .............................................. 418/94
[51] Int. Cl.² ........................................ F01C 21/06
[58] Field of Search ............................... 418/91, 94

[56] References Cited

UNITED STATES PATENTS

| | | | |
|---|---|---|---|
| 3,444,842 | 5/1969 | Bensinger et al. | 418/91 |
| 3,469,505 | 9/1969 | Bensinger | 418/61 A |

Primary Examiner—William L. Freeh
Assistant Examiner—Leonard Smith
Attorney, Agent, or Firm—Wegner, Stellman, McCord, Wiles & Wood

[57] ABSTRACT

Structure providing improved cooling of the rotor of a rotary engine. The cooling structure includes flow passages for passing a portion of the bearing lubricant through the apices of the rotor. Radially extending portions of the flow passages may be provided in the end walls of the rotor. Delivery of the bearing lubricant to the rotor flow passages may be at one end of the bearing or at a mid-portion of the bearing as desired. The flow passages may include passages in the apices of the rotor extending between the end walls thereof and communicating at their opposite ends with radial passages in the end walls. In one form, the passages in the apices communicate at one end with a radial passage to a rotor cavity having an axial passage therefrom through the end wall at that end.

3 Claims, 4 Drawing Figures

COOLED ROTOR

BACKGROUND OF THE INVENTION

1. Field of the Invention

This invention relates to rotary engine structures and in particular to means for cooling the rotors of such engines.

2. Description of the Prior Art

In U.S. Pat. No. 3,206,108 of Hubert Abermuth, a rotary piston internal combustion engine is disclosed wherein the piston is provided with passages and cavities adapted to convey lubricant serving as a liquid cooling medium. The coolant carrying passages include radial passages in the piston substantially in the axially located central transverse plane of the piston and axial passages in the piston at opposite sides of the sealing strip. The axial passages are closed at their opposite ends and the radial passages communicate with the axial passages adjacent the center thereof. The piston further includes radial passages extending from the opposite ends of the axial passages inwardly toward the axis of the piston to an annular chamber within the piston. The Abermuth structure requires the provision of a web in the center of the rotor which not only increases the mass of the rotor but makes the rotor substantially more expensive in requiring complicated manufacturing processes such as including complicated coring.

Other prior art of some pertinency to the problem of rotor cooling includes the British patent specification No. 893,938 of NSU Mohorenwerke Aktiengesellschaft and Wankel GmbH. In said British patent, the rotor is provided with an internal cavity with inlet and outlet openings for the flow of a cooling liquid therethrough. A partial flow of the liquid is branched off for lubrication of the bearing surfaces.

In British patent specification No. 928,419, of Daimler-Benz Aktiengesellschaft, a means for cooling the piston of a rotary piston engine is disclosed wherein a liquid coolant is supplied through a hollow engine shaft and forced through an annular passage in the piston which is divided into two halves by a partition extending at right angles to the shaft axis. Coolant admission bores are provided opening into one-half of the annular passage near the middle of each of the piston sides and return bores are provided leading away from the other half near the middle of each of the piston sides. The coolant may be lubricating oil which is also used to lubricate the engine.

In U.S. Pat. No. 3,269,370 of Hanns-Dieter Paschke et al, a rotor cooling means for a rotary mechanism is disclosed wherein cooling fluid is collected by a collecting member attached to the eccentric shaft of the engine for rotation therewith relative to the rotor. A plurality of cooling compartments of the rotor periodically move into communication with cooling collecting pockets of the cooling collecting member. One collecting pocket has an opening which periodically communicates with rotor openings communicating with compartments in the rotor interior as the rotor rotates relative to the eccentric end shaft. The cooling fluid is periodically directed radially inwardly where it is collected in the collecting pockets and discharged from the engine.

Yasuo Tatsutomi, in U.S. Pat. No. 3,302,624, shows a rotary piston and cooling means therefor which cools the rotor by circulation of cooling fluid as a result of the action of alternate acceleration and deceleration of the rotational velocity of the piston. The piston includes vanes extending radially outwardly within a hollow interior thereof and at an angle to a radial plane through the axis of rotation. The lateral end walls are provided with apertures between the vanes for passing the cooling fluid.

Wolf-Dieter Bensinger et al U.S. Pat. No. 3,444,842 shows a rotary piston internal combustion engine wherein an annular space is provided within the hub which is subdivided by walls arranged to centrifuge the lubricating oil. A collecting screen is provided within an area of the end wall of the eccentric for conducting the collected oil in an axial direction. The patentees point out that in case of need, the oil conducted through the piston may also be utilized to cool the piston.

Wolf-Dieter Bensinger, in his U.S. Pat. No. 3,469,505, shows another means for cooling a rotary piston wherein only the corners of the piston are cooled by oil escaping out of the bearing of the piston and bearings of the eccentric shaft. The piston corners may be provided with apertures along the radially outer circumference of an annular groove parallel to the end wall of the piston and covered by ribs.

SUMMARY OF THE INVENTION

The present invention comprehends an improved means for cooling the rotor of a rotary engine wherein one or more axial passages are provided in the rotor apices. A portion of the bearing lubricant is delivered to one end of the apical passages through a radial passage provided in one end wall of the rotor. The lubricant coolant is returned radially inwardly through a second radial passage in the opposite end wall of the rotor so as to permit discharge thereof into the rotor cavity for disposal thereof in a conventional manner.

The apical passage may open directly through the other end wall or through a radial passage therein, as discussed above. The delivery of lubricant coolant may be effected into the radial passage in the first end wall at one end of the bearing. Alternatively, the bearing may be split and means provided in the rotor for receiving a portion of the lubricant delivered to the space between the bearing portions for conduction through the radial passage in the first end wall to the apical cooling passages.

In a modified form, the lubricant coolant is returned through passages in the rotor and a rotor cavity with the discharge from the rotor cavity being spaced substantially radially inwardly of the apex seal.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
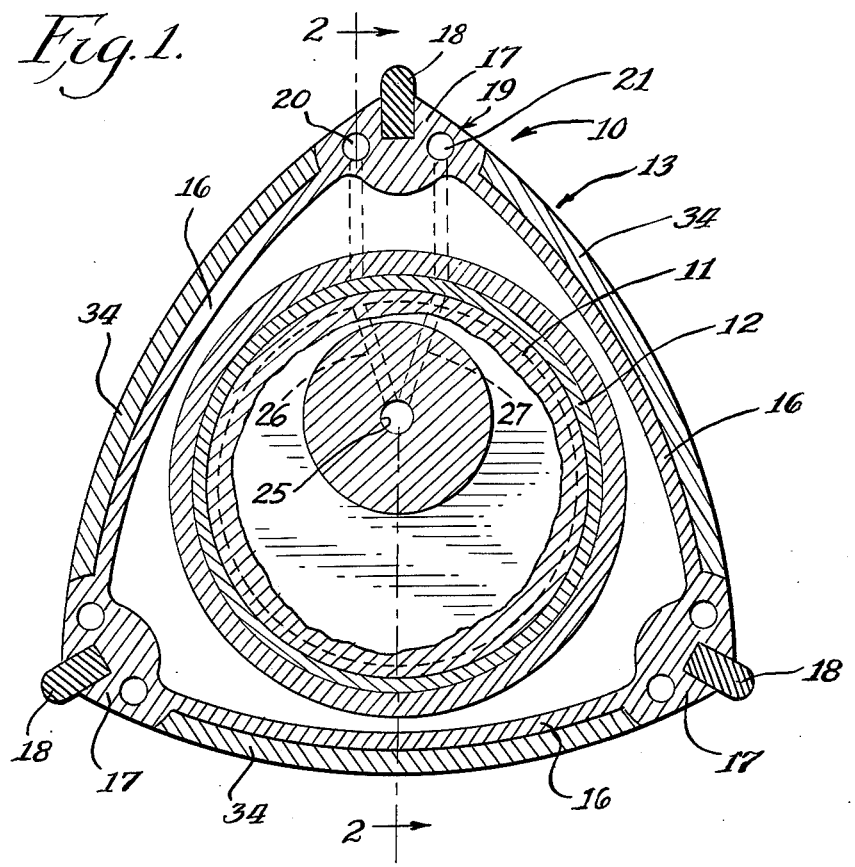
FIG. 1 is a transverse section of a rotary engine structure having improved rotor cooling means embodying the invention.
Figure 2:
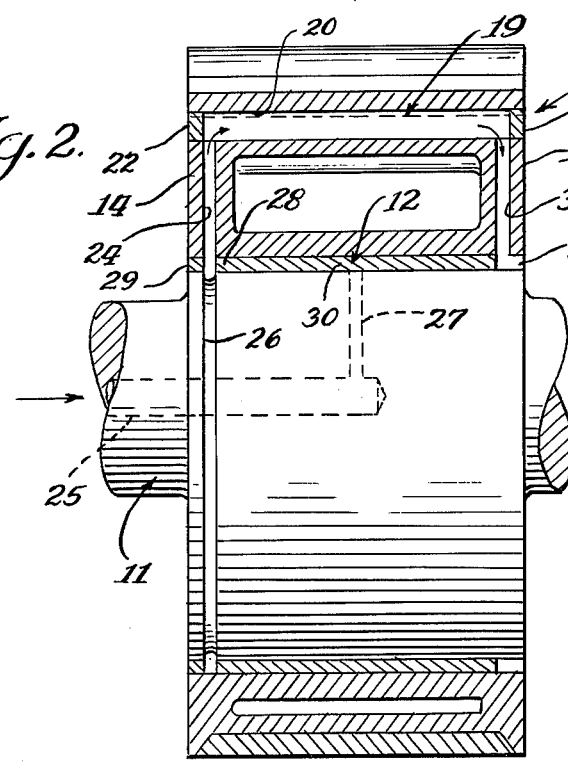
FIG. 2 is a section thereof taken substantially along the line 2—2 of FIG. 1.

In the exemplary embodiment of the invention as disclosed in FIGS. 1 and 2 of the drawing, a rotary engine structure generally designated 10 is shown to include a center shaft 11, an annular bearing 12 journalling the shaft, and a rotor generally designated 13 carried on the bearing. Rotor 13 includes opposite first end wall 14 and second end wall 15 and a plurality of outer arciform side walls 16 intersecting at a plurality of apices 17. The apices carry conventional seals 18.

As indicated above, the invention herein is directed to an improved cooling of the rotor wherein coolant fluid is delivered through cooling fluid passage means generally designated 19 in each of the apices. As illustrated in FIG. 1, the cooling fluid passage means may include a plurality of axial passages which, in the illustrated embodiment, comprises a pair of axial passages 20 and 21 disposed one each at opposite sides of the seal 18. As shown in FIG. 2, the passages may comprise parallel through bores extending to and through the end walls 14 and 15 and closed at the opposite ends by suitable plugs 22 and 23. As shown in FIG. 1, arciform insulation elements 34 may be provided on the side walls 16 to extend between the apices 17 for minimized heat rejection through the walls and the temperature of the seals.

Lubricant coolant is delivered to the cooling passages through radial passages 24 in the first end wall 14 of the rotor, as shown in FIG. 2. Thus, shaft 11 may be provided with an axial lubricant passage 25 having radial outlet portions 26 and 27. Radial passage 26 may open through the shaft at one end 28 of bearing 12 to communicate directly with the radially inner end of the end wall passage 24. A suitable seal 29 may be provided axially outwardly from the bearing end 28 in the end wall 14, as shown in FIG. 2, for sealing the flow passage at the connection between shaft passage portion 26 and end wall passage 24.

Figure 4:
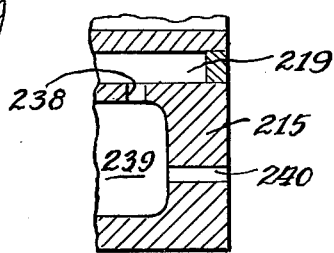
FIG. 4 is a fragmentary section showing another modified form of rotor cooling means embodying the invention.

Lubricant may be provided from passage 25 to the center, or intermediate, portion 30 of bearing 12 through radial passage portion 27, as illustrated in FIG. 2. The lubricant coolant may be delivered from passage 19 through a radial passage 31 in end wall 15 to an outlet 32 to the crankcase through the end wall at the righthand end of bearing 12. Alternatively, as shown in FIG. 4, the lubricant coolant flowed through passage means 219 may be discharged through a passage 238 into the central rotor cavity 239 in the vicinity of plug 23 and outwardly therefrom through apertures 240 in end wall 215 into the engine crankcase in the conventional manner.

The use of the end walls as the means for conducting the lubricant coolant to and from the cooling passage means 19 provides a simplified low cost structure which, by eliminating the need for central webs and the like, provides a low cost advantageous rotor structure.

Figure 3:
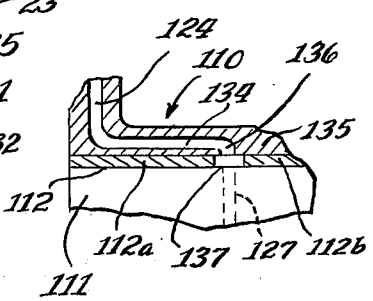
FIG. 3 is a fragmentary section showing a modified form of rotor cooling means embodying the invention.

As illustrated in FIG. 3, a modified form of rotor structure generally designated 110 is illustrated to include an axial passage 134 in an annular inner portion 135 of the rotor carried on the bearing 112. Axial passage 134 opens at its inner end through an inlet 136 to a space 137 between spaced bearing portions 112a and 112b of bearing 112 communicating with the outer end of radial passage 127 of the lubricant supply means. The axially outer end of passage 134 communicates with the radially inner end of the end wall passage 124. Thus, in the structure of FIG. 3, the end seal 29 is eliminated as the coolant passage does not extend through the end wall and a single delivery passage 127 may be provided in the shaft 111 to the center of the bearing means 112 for effecting both the lubrication of the bearing and the delivery of the lubricant coolant to the rotor apices. Rotor structure 110 is similar to rotor structure 10 except as otherwise noted and elements thereof similar to elements of structure 10 are identified by similar reference numerals but 100 higher.

The foregoing disclosure of specific embodiments is illustrative of the broad inventive concepts comprehended by the invention.

What is claimed is:

1. In a rotary engine structure having a center shaft defining an axis of rotation, an annular bearing coaxially journalling said shaft and having opposite ends and an axial mid-portion, a rotor coaxially carried by said bearing having opposite end walls and a plurality of outer arciform side walls intersecting at a plurality of apices provided with seals, improved means for cooling said rotor comprising: means in each apex defining an axial cooling fluid passage extending between said end walls; means at one of said end walls defining a first fluid duct opening inwardly to one end of said bearing and outwardly to said cooling passage; means at the other of said end walls defining a second fluid duct opening inwardly to the other end of said bearing from said cooling passage; and lubricant supply means for conducting fluid through said shaft in a first path directly to said first fluid duct and in a second path directly to said mid-portion of the bearing for lubricating the bearing by flow axially outwardly in both opposite directions from said mid-portion, the flow in one direction being to said first fluid duct for flow with the lubricant delivered thereto from said first path seriatim through said first fluid duct, said cooling passage, and said second fluid duct to cool said apices.

2. The rotary engine cooling means of claim 1 wherein said rotor further defines a cavity and said second fluid duct in the rotor includes a first portion opening from said cooling passsage to said cavity and a second portion opening outwardly from said cavity to said other end of the bearing, said cavity having a cross section substantially larger than that of said duct portion.

3. The rotary engine cooling means of claim 2 wherein said second fluid duct portion extends axially and is spaced substantially radially inwardly of said cooling passage.